US008966496B2

(12) United States Patent
Bhat et al.

(10) Patent No.: US 8,966,496 B2
(45) Date of Patent: Feb. 24, 2015

(54) LOCK FREE USE OF NON-PREEMPTIVE SYSTEM RESOURCE

(75) Inventors: Kavana N. Bhat, Bangalore (IN);
Shajith Chandran, Bangalore (IN);
Sameer K. Sinha, Siwan (IN);
Muthulakshmi P. Srinivasan,
Bangalore (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 384 days.

(21) Appl. No.: 13/314,328

(22) Filed: Dec. 8, 2011

(65) Prior Publication Data
US 2013/0152105 A1 Jun. 13, 2013

(51) Int. Cl.
*G06F 9/46* (2006.01)
(52) U.S. Cl.
USPC .......................................................... 718/108
(58) Field of Classification Search
None
See application file for complete search history.

(56) References Cited

U.S. PATENT DOCUMENTS

| 5,896,141 | A  | * | 4/1999  | Blaho et al. ............... 345/541 |
| 7,140,015 | B1 |   | 11/2006 | Bhanjois et al. |
| 7,360,223 | B2 | * | 4/2008  | Durai ........................... 719/328 |
| 7,603,502 | B2 |   | 10/2009 | Richter et al. |
| 7,624,395 | B2 |   | 11/2009 | Dostert |
| 7,721,286 | B2 |   | 5/2010  | D'Souza |
| 2010/0229179 | A1 | | 9/2010 | Moore et al. |

FOREIGN PATENT DOCUMENTS

WO   WO2005048010 A2   5/2005

OTHER PUBLICATIONS

Ruchi Kaji, "CPU Inheritance Scheduling", Paper guided by: Prof. D.C. Jinwala, pp. 1-24.

* cited by examiner

*Primary Examiner* — Mengyao Zhe
(74) *Attorney, Agent, or Firm* — Katherine S. Brown; Jeffrey L. Streets

(57) ABSTRACT

A computer-implemented method for lock-free use of a non-preemptive system resource by a preemptive thread, which may be interrupted. The method comprises registering a non-preemptive system resource and a first level reclaim handler for the non-preemptive system resource with the kernel of an operating system, registering a second level reclaim handler with the kernel, wherein the second level reclaim handler is included in an application program, and running the application program as a preemptive thread using the non-preemptive system resource. The first level reclaim handler is code that is a part of the implementation of the non-preemptive system resource in the kernel. The second level reclaim handler is code that is part of the application and is registered with the kernel before the application uses the non-preemptive system resource. The method enables a preemptive thread using a non-preemptive system resource to be preempted without crashing.

19 Claims, 2 Drawing Sheets

LOCK FREE USE OF NON-PREEMPTIVE SYSTEM RESOURCE

BACKGROUND OF THE INVENTION

1. Field of the Invention

The present invention relates to the handling of a non-preemptive system resource when a thread using the non-preemptive system resource is preempted.

2. Background of the Related Art

When a thread needs to use a system level resource, a locking mechanism is used to prevent other threads from reclaiming the resource. However, it may not be feasible in all circumstances to use a lock. For example, in a tracing tool, where the target process is patched, the patched code is a non-preemptive system wide resource, because, when the process is executing the patch, it is expected that the patched code is not removed. Currently, it is necessary to prevent removing of the patched code when the thread is running. However, there is nothing to prevent a thread running in the patched code from being dispatched out. If a thread is preempted out while running in the patched code, the thread will core dump on dispatch if the resource is freed.

BRIEF SUMMARY OF THE INVENTION

One embodiment of the present invention provides a computer-implemented method comprising: registering a non-preemptive system resource and a first level reclaim handler for the non-preemptive system resource with the kernel of an operating system in a computer system; registering a second level reclaim handler with the kernel, wherein the second level reclaim handler is included in an application program; and running the application program as a preemptive thread using the non-preemptive system resource.

Another embodiment of the present invention provides a computer program product including computer usable program code embodied on a computer usable medium for enabling lock-free use of a non-preemptive resource by a preemptive thread. The computer program product includes computer usable program code for registering a non-preemptive system resource and a first level reclaim handler for the non-preemptive system resource with the kernel of an operating system in a computer system; computer usable program code for registering a second level reclaim handler with the kernel, wherein the second level reclaim handler is included in an application program; and computer usable program code for running the application program as a preemptive thread using the non-preemptive system resource.

DETAILED DESCRIPTION OF THE INVENTION

Figure 1:
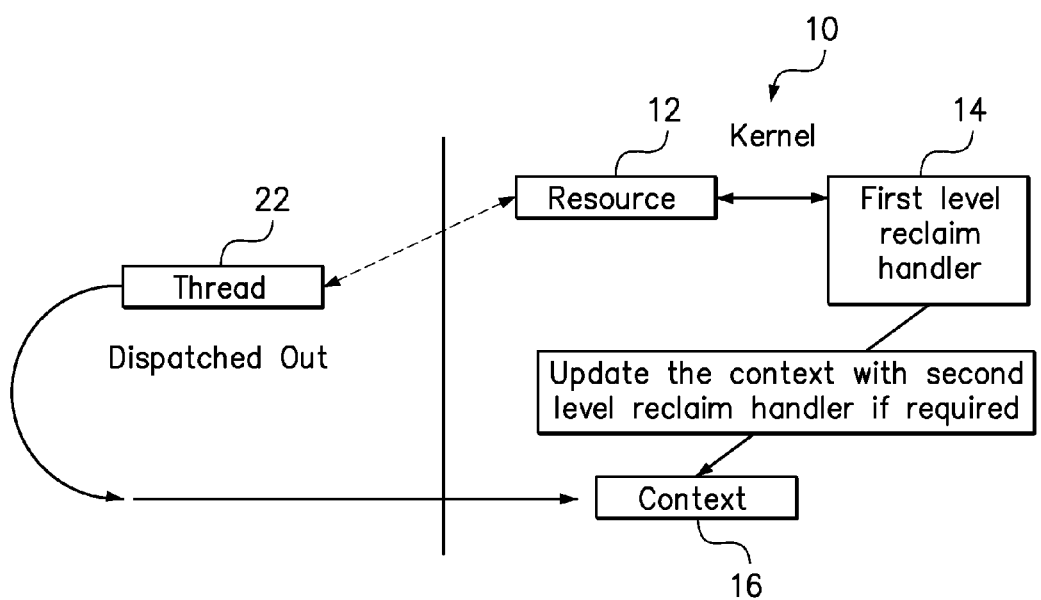
FIG. 1 is a schematic process diagram.

One embodiment of the present invention provides a computer-implemented method for lock-free use of a non-preemptive system resource by a preemptive thread, which may, for example, be interrupted by a higher priority task. The method comprises registering a non-preemptive system resource and a first level reclaim handler for the non-preemptive system resource with the kernel of an operating system in a computer system, registering a second level reclaim handler with the kernel, wherein the second level reclaim handler is included in an application program, and running the application program as a preemptive thread using the non-preemptive system resource. The first level reclaim handler is code that is a part of the implementation of the non-preemptive system resource in the kernel. The second level reclaim handler is code that is part of the application and is registered with the kernel before the application uses the non-preemptive system resource. Accordingly, the kernel is made aware of the non-preemptive system resource, the first level reclaim handler associated with the non-preemptive system resource, and the second level reclaim handler of applications that may use the non-preemptive system resource. The method is preferably implemented so that a preemptive thread that is using a non-preemptive system resource can be preempted without crashing the preemptive thread. Furthermore, the method makes it unnecessary to promote the current thread to execute in a non-preemptive mode in order to use a non-preemptive resource.

The method may, for example, further comprise dispatching the preemptive thread while the preemptive thread is using the non-preemptive system resource. In one option, the thread may be dispatched in response to a timer interrupt to switch processes. In response to the preemptive thread being dispatched while using the non-preemptive system resource, the first level handler revises the context of the preemptive thread so that the preemptive thread will resume in the second level handler. Optionally, the preemptive thread is dispatched by a dispatch handler of a scheduler process, and the dispatch handler calls the first level handlers of all system resources and instructs the first level handler of any system resource to revise the context of the preemptive thread if the preemptive thread is using the associated system resource at the time the thread is dispatched. The revised context will cause the preemptive thread to resume in the second level handler in response to resuming the preemptive thread. In one embodiment, the first level handler revises the context of the preemptive thread by recording an instruction address of the second level handler for the application as part of the context for the preemptive thread. As a result, the preemptive thread will resume in the second level handler at the instruction address recorded in the context.

Still further, the method may, for example, further comprise the dispatch handler resuming the preemptive thread. The revised context for the preemptive thread then causes the preemptive thread to resume in the second level reclaim handler. Preferably, the dispatch handler will determine whether the non-preemptive system resource is available. In response to determining that the non-preemptive system resource is available at the time the thread is resumed, the dispatch handler may instruct the second level reclaim handler to resume use of the non-preemptive system resource. In response to determining that the non-preemptive system resource is not available at the time the thread is resumed, the dispatch handler may instruct the second level reclaim handler to clean up a thread state of the thread so that the thread can resume normally without crashing. According to one option, the second level reclaim handler handles any errors, and then reclaims the non-preemptive resource. For example, the second level handler reclaiming the resource in response to determining that the non-preemptive system resource is no longer allocated to the preemptive thread.

In one embodiment of the invention, the non-preemptive resource is a non-preemptive region of code, such as a global code region, like low memory, that can be used by more than one thread at a time. Accordingly, the method may include registering the non-preemptive region of code with the kernel, and identifying an address range where the non-preemptive region of code is stored. The first level reclaim handler may then compare a current instruction register of the thread with the address range of the non-preemptive region of code to determine whether the thread is using the non-preemptive region of code.

Low memory is a global code region which can be accessed by all the threads in AIX. This piece of code can be accessed by any thread because they will fall in kernel address space which is accessible from user space. This global kernel address can be used by more than one thread at a time. And in AIX, low memory is one such resource.

FIG. 1 is a schematic process diagram. A resource 12 and a first level reclaim handler 14 have been registered with a kernel 10. A thread 22 is dispatched out causing changes to the thread's context 16. If it is determined that the thread was dispatched out at a time that the thread was using the resource 12, then the first level reclaim handler 14 will update or revise the context 16 (associated with the thread). As shown, the first level reclaim handler 14 is updating the context 16 to identify, such as by providing an address to, a second level reclaim handler where the thread 22 should resume execution.

Figure 2:
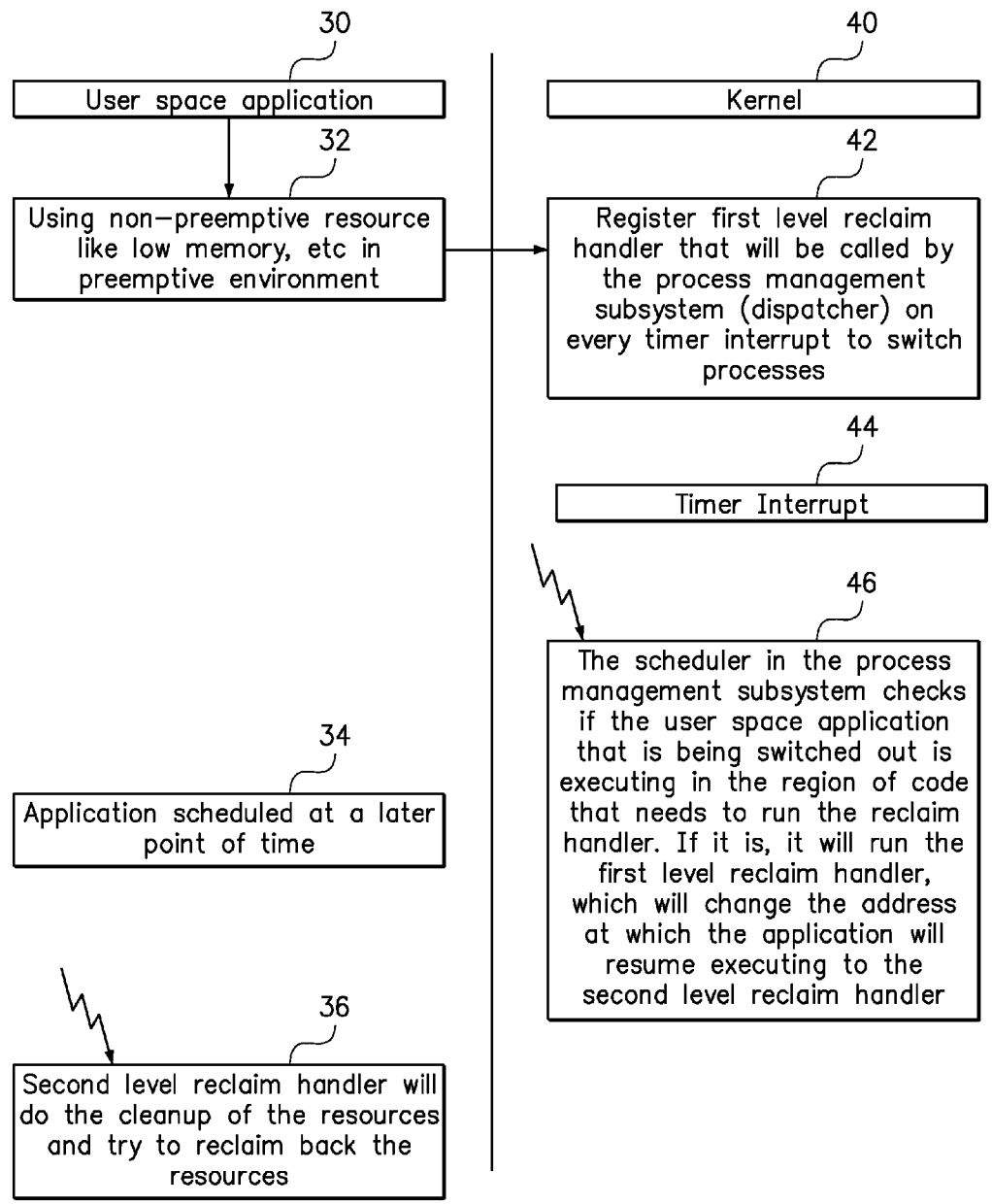
FIG. 2 is a schematic process diagram.

FIG. 2 is another schematic process diagram. A user space application 30 may be run in a preemptive environment and use a non-preemptive resource, such as low memory, in step 32. In the kernel 40, a first level reclaim handler is registered in step 42, wherein the first level reclaim handler will be called by the process management subsystem (dispatcher) on every timer interrupt to switch processes. In response to the timer interrupt in step 44, the scheduler in the process management subsystem determines, in step 46, whether the user space application that is being switched out is using a non-preemptive system resource, such as executing in the region of code that needs to run the reclaim handler. If the application is executing in that region of code, then the first level reclaim handler will change the address at which the application will resume executing, where the new address points to the second level reclaim handler. When the application is subsequently scheduled to resume in step 34, the application resume in the second level reclaim handler that, in accordance with step 36, will do the cleanup of the resources and try to reclaim back the resources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
registering a non-preemptive system resource and a first level reclaim handler for the non-preemptive system resource with the kernel of an operating system in a computer system;
registering a second level reclaim handler with the kernel, wherein the second level reclaim handler is code that is part of an application program;
running the application program as a preemptive thread using the non-preemptive system resource; and
dispatching the preemptive thread while the preemptive thread is using the non-preemptive system resource; and
in response to the preemptive thread being dispatched while using the non-preemptive system resource, the first handler revising the context of the preemptive thread so that the preemptive thread will resume in the second level handler such that the second handler reclaims back the non-preemptive resource.

2. The method of claim 1, wherein the first level reclaim handler is code that is a part of the implementation of the non-preemptive system resource in the kernel.

3. The method of claim 1, wherein the second level reclaim handler is registered with the kernel before the application uses the non-preemptive system resource.

4. The method of claim 1, wherein the preemptive thread is dispatched by a dispatch handler of a scheduler process, the method further comprising:
the dispatch handler instructing the first level handler to revise the context of the preemptive thread so that the preemptive thread will resume in the second level handler in response to resuming the preemptive thread.

5. The method of claim 4, further comprising:
the first level handler revising the context of the preemptive thread by recording an instruction address of the second level handler for the application as part of the context for the preemptive thread, wherein the preemptive thread will resume in the second level handler at the instruction address recorded in the context.

6. The method of claim 4, wherein the preempted thread is placed in a run queue.

7. The method of claim 4, further comprising:
the dispatch handler resuming the preemptive thread;
the revised context for the preemptive thread causing the preemptive thread to resume in the second level reclaim handler; and
the dispatch handler determining whether the non-preemptive system resource is available.

8. The method of claim 7, further comprising:
in response to determining that the non-preemptive system resource is available at the time the thread is resumed, the dispatch handler instructing the second level reclaim handler to resume use of the non-preemptive system resource.

9. The method of claim 7, further comprising:
in response to determining that the non-preemptive system resource is not available at the time the thread is resumed, the dispatch handler instructing the second level reclaim handler cleaning up a thread state of the thread so that the thread can resume normally without crashing.

10. The method of claim 7, further comprising:
the second level reclaim handler handling any errors; and then
the second level reclaim handler reclaiming the non-preemptive resource.

11. The method of claim 1, further comprising:
dispatching the thread in response to timer interrupt to switch processes.

12. The method of claim 8, further comprising:
the second level handler reclaiming the resource in response to determining that the non-preemptive system resource is no longer allocated to the preemptive thread.

13. The method of claim 4, wherein the preemptive thread using a non-preemptive system resource can be preempted without crashing the preemptive thread.

14. The method of claim 1, wherein the non-preemptive resource is a non-preemptive region of code.

15. The method of claim 14, further comprising:
registering the non-preemptive region of code with the kernel; and
identifying an address range where the non-preemptive region of code is stored.

16. The method of claim 15, further comprising:
the first level reclaim handler comparing a current instruction register of the thread with the address range of the non-preemptive region of code to determine whether the thread is using the non-preemptive region of code.

17. The method of claim 1, wherein the non-preemptive resource is a global code region that can be used by more than one thread at a time.

18. The method of claim 17, wherein the global code region is low memory.

19. The method of claim 1, wherein the preemptive thread can access a non-preemptive system resource without using a lock.

* * * * *